(12) United States Patent
Amouroux et al.

(10) Patent No.: US 12,053,996 B2
(45) Date of Patent: Aug. 6, 2024

(54) SYSTEM AND PROCESS FOR SELECTIVELY AND LOCALLY TREATING THE SURFACE OF PARTS, ESPECIALLY VIA DEPOSITION OF MATERIAL

(71) Applicant: WESTLAKE COMPOUNDS HOLDING, Reims (FR)

(72) Inventors: Nicolas Amouroux, Reims (FR); Mustapha El Fouzari, Reims (FR); Hossam Elaarag, Reims (FR)

(73) Assignee: WESTLAKE COMPOUNDS HOLDING, Reims (FR)

(*) Notice: Subject to any disclaimer, the term of this patent is extended or adjusted under 35 U.S.C. 154(b) by 0 days.

(21) Appl. No.: 17/612,596

(22) PCT Filed: May 19, 2020

(86) PCT No.: PCT/FR2020/000175
§ 371 (c)(1),
(2) Date: Nov. 19, 2021

(87) PCT Pub. No.: WO2020/234517
PCT Pub. Date: Nov. 26, 2020

(65) Prior Publication Data
US 2024/0033995 A1 Feb. 1, 2024

(30) Foreign Application Priority Data
May 20, 2019 (FR) ........................ 1905232

(51) Int. Cl.
*B41J 3/407* (2006.01)
*B05D 3/00* (2006.01)
(Continued)

(52) U.S. Cl.
CPC .............. *B41M 5/26* (2013.01); *B05D 3/007* (2013.01); *B05D 3/065* (2013.01);
(Continued)

(58) Field of Classification Search
CPC . B41J 2/01; B41J 3/4073; B41J 11/008; B41J 40/20; B41J 2203/011; B25J 9/16;
(Continued)

(56) References Cited

U.S. PATENT DOCUMENTS

2015/0100149 A1* 4/2015 Coeck ................. G01S 5/16
                                                      700/120
2018/0322621 A1 11/2018 Craeghs et al.

FOREIGN PATENT DOCUMENTS

DE      102012212469 A1    1/2014
FR           3023943 A1    1/2016
(Continued)

OTHER PUBLICATIONS

International Search Report for EPO Patent Application No. 2020000175, (Nov. 13, 2020).

*Primary Examiner* — Anh T Vo
(74) *Attorney, Agent, or Firm* — Jordan IP Law, LLC; Todd A. Vaughn (57) ABSTRACT

Process for selectively and locally treating the surface of a part, wherein—a part having a surface to be treated is provided, said surface being defined by a direction P and a direction Q; —three-dimensional profilometric data are acquired from the surface to be treated, in order to obtain a set F1 of three-dimensional data on the surface to be treated, said set F1 associating a height with each point in the plane PQ; —this set F1 of digital data is processed digitally with a view to subtracting said curves, to obtain a set F2 of reprocessed three-dimensional data; —this set F2 of data is processed digitally, to obtain a set F3 of binary data on the surface to be treated, said digital processing attributing, to each point on the surface, a first binary value or a second binary value, depending on at least one criterion related to the height of the point on the surface; —the surface is selectively and locally treated using said set F3 of binary (Continued)

data, said surface treatment being performed only at points on the surface the binary datum of which has said first or said second binary value.

20 Claims, 6 Drawing Sheets (51) Int. Cl.
B05D 3/06 (2006.01)
B29C 64/386 (2017.01)
B29C 71/00 (2006.01)
B29C 71/04 (2006.01)
B41J 2/01 (2006.01)
B41J 11/00 (2006.01)
B41M 5/00 (2006.01)
B41M 5/24 (2006.01)
B41M 5/26 (2006.01)

(52) U.S. Cl.
CPC .......... B29C 71/0009 (2013.01); B29C 71/04 (2013.01); B41J 2/01 (2013.01); B41J 3/4073 (2013.01); B41J 11/008 (2013.01); B41M 5/0088 (2013.01); B41M 5/24 (2013.01)

(58) Field of Classification Search
CPC ... B29C 64/386; B29C 71/00; B29C 71/0009; B29C 71/04; B05D 3/007; B05D 3/065; B41M 5/0088; B41M 5/24; B41M 5/26
See application file for complete search history.

(56) References Cited

FOREIGN PATENT DOCUMENTS

| | | | | |
|---|---|---|---|---|
| KR | 20160014585 | * | 2/2016 | |
| WO | WO 2004100044 | * | 11/2004 | ............. G06F 19/00 |

* cited by examiner

SYSTEM AND PROCESS FOR SELECTIVELY AND LOCALLY TREATING THE SURFACE OF PARTS, ESPECIALLY VIA DEPOSITION OF MATERIAL

CROSS-REFERENCE TO RELATED APPLICATIONS

The present application is a National Stage Application of PCT International Application No. PCT/FR2020/000175 (filed on May 19, 2020), under 35 U.S.C. § 371, which claims priority to French Patent Application No. 1905232 (filed on May 20, 2019), which are each hereby incorporated by reference in their complete respective entireties.

TECHNICAL FIELD

The invention relates to methods for selectively and locally treating the surface of parts via deposition of material, and more particularly via inkjet printing. More particularly, the invention relates to a surface treatment process that comprises a step of selective and local decoration via ink deposition on zones that will be determined during the execution of the process itself, according to their relief. This process can be used for the decoration of parts with shapes that have a regular or irregular surface relief, such as a graining, a seam, a seal, a logo, a pattern, or an edge.

PRIOR ART

Techniques for treating the surface of parts via deposition of material are known, for example inkjet printing. These techniques can be used to print images on large-size surfaces, with these surfaces having for example a dimension from about a few decimeters to one or two meters. The printing can be performed by an inkjet printhead which is displaced at the end of an arm of a multi-axis robot.

Such a system is described in patent application U.S. Patent Publication No. 2015/0042716 (Heidelberger Druckmaschinen AG). It is capable of printing images via inkjet on curved surfaces such as automobile bodies. Similar systems are described in documents U.S. Patent Publication No. 2014/0063096 (Heidelberger Druckmaschinen AG), for printing on automobile bodies, and U.S. Patent Publication No. 2013/0314460 (Exatex), for printing on automobile windows. European Patent Publication No. 2 873 496 A1 (ABB Technology AG) proposes a similar system wherein the inkjet printhead is connected to the arm of a six-axis robot by a piezoelectric actuator capable of performing a controlled movement.

These systems generally comprise a system for acquiring the overall shape (flat or curved) of the part over the path that will be the path of the inkjet printhead. They are capable of printing the image on this flat or curved surface. These systems however are not suitable for another use, for while they were moreover not designed, namely the selective treatment of the surface of zones coming from local relief aspects, for example bosses, folds, grooves or other aspects. Such surface aspects for example are found on leather surfaces, natural or artificial, where they can be caused by the graining of the leather or by seams. Even in the case of parts obtained by molding in the same mold, the position and the shape of these local relief aspects is not strictly reproducible from one part to another. During the decoration of such a surface via printing, the positioning of the image can become imprecise via this lack of reproducibility of the surface relief.

Systems according to the prior art are capable of printing an image on such surfaces that have local aspects, based on the overall shape of the previously-acquired part, and by neglecting the local aspects of the surface; this printing can be of sufficient precision if the printed image does not have to be superimposed on a local relief. On the other hand, systems according to the prior art are not capable of selectively treating these local surface aspects. By way of example, they are not capable of selectively depositing ink on the seam lines of a leather surface, or of selectively coloring the graining line (i.e. the depression between two grains) of a leather surface. The term "leather surface" refers here to the surface aspect, not to the material the chemical nature of which is of no importance for the problem at hand; this leather surface could be an artificial leather surface, such as a plastic material, as is common for example in the field of automobile dashboards.

The problem that the present invention seeks to resolve is to propose a system for treating flat or curved surfaces, which allows for the selective treating of surfaces, for example selective decoration, of zones of said surface that are inscribed in relief (either as a depression, or as a protuberance) on said surface. This system has to have an offset as low as possible in a direction taken parallel to the plane of the substrate, and an offset as low as possible in the direction perpendicular to the plane of the substrate.

SUMMARY OF THE INVENTION

A first object of the invention is a process for selectively and locally treating the surface of a part, wherein:
(a) A part having a surface to be treated is provided, said surface being defined by a direction P and a direction Q, said surfaces P and Q able to have a curve;
(b) Three-dimensional profilometric data are acquired from the surface to be treated, in order to obtain a set F1 of three-dimensional data on the surface to be treated, said set F1 associating a height with each point in the plane PQ;
(c) This set F1 of data is processed digitally with a view to subtracting said curves, to obtain a set F2 of reprocessed three-dimensional data on the surface to be treated;
(d) This set F2 of data is processed digitally, to obtain a set F3 of binary data on the surface to be treated, said digital processing attributing, to each point on the surface, a first binary value or a second binary value, depending on at least one criterion related to the height of the point on the surface;
(e) The surface is selectively and locally treated using said set F3 of binary data, said surface treatment being performed only at points on the surface the binary datum of which has said first or said second binary value.

Typically, said surface to be treated has surface elements in relief.

In an embodiment, said three-dimensional profilometric data are obtained from a succession of linear scans according to scan lines parallel to said direction P, with a constant spacing between two neighboring scan lines, said constant spacing being preferably less than 100 μm, and more preferably less than 90 μm.

In step (c) at least one digital filtering operation of the data can be performed, for example to eliminate aberrant points.

In a particular embodiment, said criterion related to the height of the point of the surface in step (d) attributes the same binary value to all the points located between a minimum height and a maximum height.

In another particular embodiment step (d) is repeated to obtain a set of data F3' with a criterion related to the height of the point of the surface, said criterion being different from the one that was used to generate said set of data F3, and two treatments are performed according to step (e), namely one for each one of the sets of data F3 and F3', said treatments able to be of identical or different natures.

In another embodiment, that can be combined with all the others, the set of data F3 is reprocessed to remove isolated points from a surface treatment, or to remove contiguous zones from a surface treatment that do not reach a certain surface area, or to widen the contiguous zones of the surface treatment, or to round the angles of the zone of the surface treatment, or to remove holes of a size less than a certain number of points inside a zone of the surface treatment.

Typically said surface treatment is identical for all points the binary value of which takes said first or second value.

Said treatment of the surface can comprise a step of material deposition, such as the deposition of ink, or a step of removing material, such as the drilling of a hole, or a step of chemical modification of the surface, such as a supply of energy able to crosslink the surface.

In an alternative of the process a first surface treatment is performed for the points the binary datum of which takes said first binary value, then a second surface treatment for the points the binary value of which takes said second binary value.

Said part is typically selected from the group formed of:
- the cover parts of a vehicle passenger compartment, and especially of a motor vehicle, such as the cover parts of dashboards or doors,
- parts made from natural or artificial leather, especially parts for leatherwork and furnishing or parts used in the manufacturing of visible parts of leatherwork or furnishing parts,
- parts that have a fabric surface,
- metal or plastic parts manufactured in contact with the surface of a mold.

Another object of the invention is the use of the process according to the invention for the decoration of parts that have a regular or irregular surface relief, said surface relief able to represent especially a graining, a seam, a seal, an edge, a stamping. Yet another object of the invention is a device comprising: a robot comprising at least one gripping arm capable of carrying a laser profilometer, able to acquire the three-dimensional profilometric data, and at least one surface treatment tool; a computer communicating with said robot, said laser profilometer and said at least one surface treatment tool, and configured to control the activity of said robot, of said laser profilometer and of said at least one surface treatment tool; said device being configured to and able to implement the process for selectively and locally treating the surface of a part according to the invention. Advantageously, said computer is configured to perform said digital data processing in steps (c) and (d). If said surface treatment is a treatment via deposition of material, said surface treatment tool is advantageously an inkjet printhead.

A last object of the invention is a computer program comprising program code instructions for the execution of the steps of a process according to the invention, when said program operates on a computer intended and able to control the activity of a device according to the invention.

DRAWINGS

FIGS. 2 to 7 show different aspects of the invention; they do not limit the scope of the invention.

FIGS. 5A to 5C then show three different treatments of three-dimensional data with the purpose of obtaining a binary image of the surface, which defines the zone on which the surface treatment will be applied.

FIGS. 7A, 7B, 8A, and 8B show two other examples of parts the surface of which can be selectively and locally treated via deposition of material via inkjet using the process and the device according to the invention.

DETAILED DESCRIPTION

The inventors realized that printing an image on the surface that has a relief with surface aspects does not make it possible to resolve the problem satisfactorily. The term image printing here means a process wherein a predetermined image is printed, possibly redimensioned in space according to the local geometry, on a surface. According to the invention, the selective surface treatment (the printing of which represents a particular case), is done only on selected zones according to the presence of certain surface aspects, and by taking account of their height and/or of their depth and/or of the precise shape.

In a first step of the process according to the invention a part having a surface to be treated is provided. The surface to be treated of this part can be curved, typically along a long axis, and/or along a short axis that can be orthogonal or not with respect to said long axis. Said long and short axes can be straight or curved. The surface to be treated is typically a zone of a curved surface of the part, for example a longitudinal zone substantially parallel in the lengthwise direction of the part. In another embodiment the surface to be treated is not curved but substantially flat.

The surface to be treated of the part typically comprises relief elements, that can extend over all or a portion of the surface to be treated, and according to any geometric disposition or shape. These relief elements can be decorative elements.

By way of example, the relief elements can comprise protuberances or depressions. They can be disposed in narrow and elongated lines, or on the contrary extend over a substantial fraction of the surface to be treated. By way of example, the relief elements can be represented by false seams, and/or by a leather style graining, and/or by a "crocodile skin", or by all sorts of stitchings, reliefs obtained by any process whatsoever (such as marking, that can be performed hot or cold, and/or embossing, that can be performed hot or cold), or natural relief.

The part is advantageously fixed in space in a determined orientation. Advantageously it is placed on a support. If its surface to be treated has a long axis, the part is advantageously oriented in such a way that this long axis is approximately horizontal.

In an alternative the part is not fixed but is displaced during the execution of at least one of the following steps of the process. For example, it can be fixed on a movable carriage capable of being displaced according to a path that is straight or not, and/or that can be inclined in one or more directions, and/or that can undergo a rotation around at least one axis. The part can undergo a rotation about its long axis, if it has such a long axis, and/or it can undergo a rotation about its short axis, if it has such a short axis, and/or it can undergo any other type of rotation, inclination or displacement in space.

In any case, when it is desired to treat a large number of parts that are supposedly identical (coming for example from the same production series, for example coming from the same plastic mold), it is important that the support allow for a reproducible positioning of the part; where applicable a specific support has to be manufactured for each type of part.

In a second step profilometric data are acquired from the surface to be treated. These profilometry data are three-dimensional data, reconstructed from a succession of two-dimensional linear scans (called profilometric lines here) with a laser beam. These profilometry lines are parallel with one another, and the spacing between two neighboring lines is advantageously constant.

These profilometry data must first represent the global three-dimensional shape of the surface to be treated. They must also represent or make it possible to determine, with a sufficient three-dimensional resolution, the decorative elements. This minimum resolution depends on the shape of the surface to be treated, the nature and the shape of the decorative elements, the scale of the length and of the depth of the decorative elements, and of the precision requirement of the treatment of the surface to be treated.

This second step can be done for example using a measuring head of a laser scanner that is fixed on a robot arm and which performs one or more scanning passes above the surface to be treated. These passes are made advantageously parallel to the lengthwise direction of the part (direction designated here by the letter P). According to the dimension of the zone of the surface to be treated the data acquisition can be done in one or more passes. More particularly, each pass typically makes it possible to acquire data on a zone that has a certain width Q in a direction orthogonal to the line of scanning. According to the length of the surface to be treated it can therefore be necessary to subdivide the width of the zone to be treated into several subzones of which each one will be subject to at least one scanning pass; these subzones can have a partial overlapping. Typically, the data acquisition is done via a succession of individual acquisitions of linear profiles in the direction Q, with two successive individual acquisitions being spaced by the same distance in the direction P. Thus, a three-dimensional profile is constructed from a succession of two-dimensional acquisitions (profilometric lines).

A first pass in the direction P can make it possible to determine the overall shape of the surface to be treated, and a second pass can then allow for an acquisition of data with a finer resolution of the surface to be treated. At least during this second pass the distance between the measuring head and the surface remains advantageously constant or varies little (advantageously at most ±5, preferably at most ±3 mm, and more preferably at most ±2 mm), and the orientation of the laser beam with respect to the surface also remains constant. For this reason, for curved parts it is advantageous that the measuring head be fixed on the arm of a robot with five or six axes. When the surface of the part to be treated has a lengthwise direction, the scanning pass is advantageously parallel to this lengthwise direction. Advantageously a single scanning pass is performed to analyze a zone with a given width Q. In an advantageous embodiment, for highly curved parts and/or for lines P and/or Q that are not straight, it is not advantageous to modify during scanning in the direction Q the height z of the measuring head, and/or to modify during scanning in the direction P the height z of the measuring head and/or to follow the curvature of the line P and/or Q; in this case it is often preferable to limit the data acquisition zone to a zone that does not require such adjustments, and to then define another data acquisition zone that neighbors the first. In other words: it can be preferable to restrict the number of independent movements of the arm of the robot during the scanning of the measuring head. The same remark applies, during the fifth step, to the surface treatment tool, which is also carried by the arm of the robot.

This second step implies the generation of a first file of three-dimensional data of the surface of the part; this file is called F1 here. It is constructed using the data corresponding to the profilometric lines acquired in the directions Q, taken in the succession on the line P.

In a third step the profilometry data is processed digitally and analyzed. This treatment can comprise several individual steps. It can comprise a digital filtering. This filtering can be performed for each profilometric line that has been acquired, and/or for the three-dimensional profile that was reconstructed from profilometric lines.

In the framework of this filtering the aberrant points can be removed and/or the surface can be smoothed; these two operations are typically carried out using known digital techniques. More specifically, the background is then subtracted, in order to overcome the curvature of the part in the direction Z (i.e., in the direction orthogonal to the direction of scanning P). This step leads to a second file of three-dimensional data of the surface of the part; this file is called F2 here.

In an embodiment of this third step, firstly, in a first substep, on each profilometric line a digital smoothing is performed (for example by a suitable exponential filtering), then the low frequencies are advantageously removed (for example by a suitable high-pass filter), then the profile is rectified (for example via linear regression); the order of these different treatments can be modified, but the indicated order is preferred.

Then, is a second substep, the three-dimensional profile is treated, for example via a planar regression (calculation of the mean plane), and the aberrant points are removed. This treatment can for example comprise a filtering of the points according to their standard deviation, and a filtering of the points that are excessively far from the plane.

A fourth step aims to identify or locate the zones to be treated on the surface to be treated. These zones are defined by specific relief characteristics. The zones on which the surface treatment will be applied from the relief of the surface to be treated are therefore determined. This step is essential for the process according to the invention. Indeed, in the case of a printing on the surface for example, the printing process according to the invention does not consist of printing an image established beforehand on a surface; in the framework of the process according to the invention an image is not provided (for example in the form of a file), but the zones of the surface that will afterwards be treated by the selected means of surface treatment are determined during the process itself, according to the relief of the surface. In other words (and for the example of a surface treatment via inkjet printing), the fine shape of the image printed on the surface depends on the surface itself, it is not fixed beforehand.

This fourth step aims to generate the binary image (file F3) of the surface to be treated. This binary image comprises for each point in the plane QP a binary information. For each point said binary information indicates whether or not a surface treatment will be performed.

Typically, the zones to be treated are low reliefs (i.e., hollows) or high reliefs (i.e. bosses), or both at the same time. A minimum threshold and a maximum threshold of height are then adjusted (this height corresponding to "gray level" on an image of the surface), and the points comprised between the minimum threshold and the maximum threshold will be defined as "black" points (i.e., will undergo surface treatment), and the points above the maximum threshold and below the minimum threshold will be "white" (i.e., will not undergo surface treatment). This determination of thresholds (for example the deviation between the maximum threshold and the minimum threshold) can be the same for different similar parts of the same series, and especially for parts coming from the same mold.

In a fifth step treatment of the surface to be treated is carried out. This treatment typically comprises a deposition of material. Typically, this surface treatment is done via a surface treatment tool which is fixed on a robot arm and which performs one or more scanning passes above the surface to be treated, preferably along a trajectory that is identical to the one used for the acquisition of profilometric data of the part. This tool can be an inkjet printhead capable of depositing an ink. The term "ink" here means any liquid preparation capable of forming, after drying and/or cross-linking, a solid deposition on a solid substrate; this term here therefore encompasses the inks that are usually used in inkjet printers, but also varnishes (colored or not, opaque or transparent) and other products.

This treatment can be done in one or more passes, and one or more inks can be used, for example a colored ink and a transparent or semi-transparent varnish deposited on top of the colored ink. This varnish can have different functions, for example a protective function against scratches, or a modification function of optical properties (antireflective function, aesthetic functions such as modification of the brightness, modification of the color perceived), or a function of modification in the feel, or an anti-soiling function.

According to an advantageous embodiment, when several inks are used during the fifth step, a different printhead is used for each ink.

According to another advantageous embodiment, that can be combined with the other advantageous embodiments and each one of the alternatives thereof, a printing system (comprising a robot, a system for determining the zone to be printed and a surface treatment tool) is used that has a precision of about X, i.e. with respect to the shape of the zone to be treated the deviation in positioning of said treatment (for example the deviation in positioning of the printing) does not exceed a value of X. This value of X is advantageously less than 100 µm, and more advantageously less than 90 µm. Advantageously a high-resolution printhead is used with a spacing of at least 360 nozzles per inch; such a head can for example include a total of 512 nozzles.

As indicated hereinabove, according to an essential characteristic of the invention the fine shape of the image printed on the surface depends on the surface itself. The process is therefore capable of identifying the zones of the surface to be treated that will be printed. By way of example, in the case where the part is an element of a motor vehicle dashboard that has seams, artificial or real, that have to be colored, the accidental absence of a stitch will be recognized by the process, and the length of the missing thread will not be colored. This example illustrates well that the process according to the printing does not entail the printing of a predefined image, but the selective surface treatment (here the coloring) of a zone the identification of which is part of the process itself.

The process according to the invention shall now be illustrated using figures.

Figure 1:
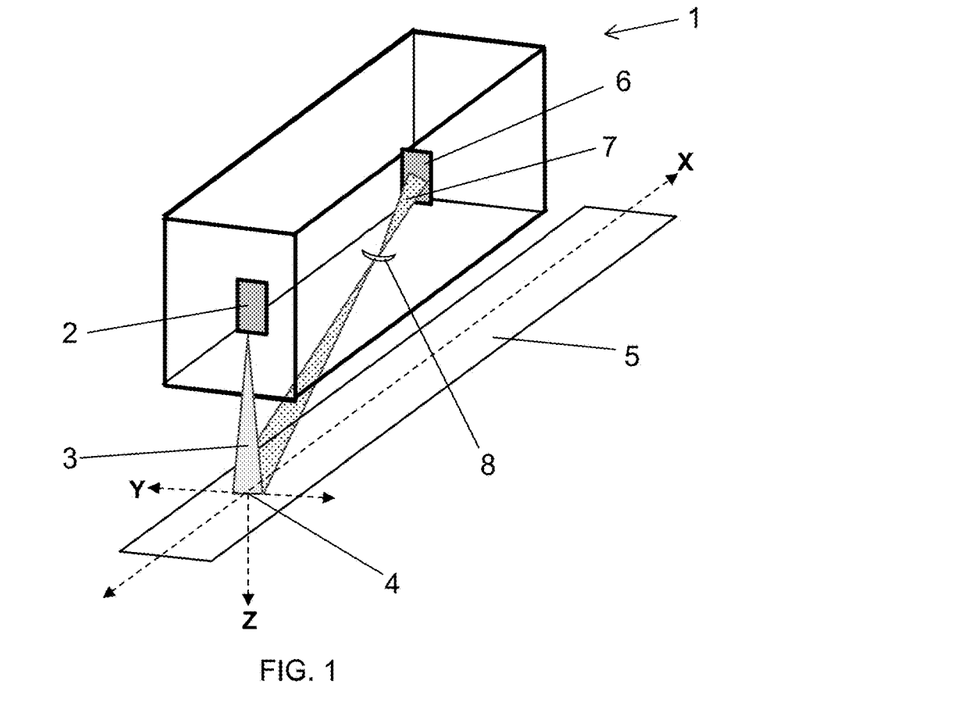
FIG. 1 schematically shows the measuring head of the surface treatment device according to the invention. This component is part of the prior art.

FIG. 1 schematically shows a measuring head that can be used in the surface treatment device according to the invention. This is typically an optical scanning profilometry, without mechanical contact with the surface to be analyzed. More precisely, the measuring head 1 includes a laser source 2 (typically a laser diode) that emits a laser beam called incident beam 3 that is directed on the surface 5 to be analyzed. A sensor 6 detects the reflected beam 7; the device typically comprises an optical system 8 comprising at least one lens which is passed through by the reflected beam. This measuring head takes on a line 4 of length Y1 parallel to the direction Y a succession of one-off measurements, spaced by a distance ΔY between two neighboring points; this distance is typically constant. For each point in the direction Y its height in the vertical direction Z is detected, and a profile of the height of the surface is obtained on a line scanned in the direction Y; this line is hereinbelow called profilometric line. Then, the measuring head or the surface is displaced by a distance ΔX in a direction designated as X, which is typically orthogonal to Y and typically corresponds to the long direction of the surface, and the profile is acquired on this line as described hereinabove. Thus, a file F1 can be obtained of points of the surface on the analyzed zone wherein each point is characterized by its three coordinates X, Y, Z. This 3D profilometry technique by laser scanning is known to those skilled in the art and will not be presented in greater detail.

Figure 2:
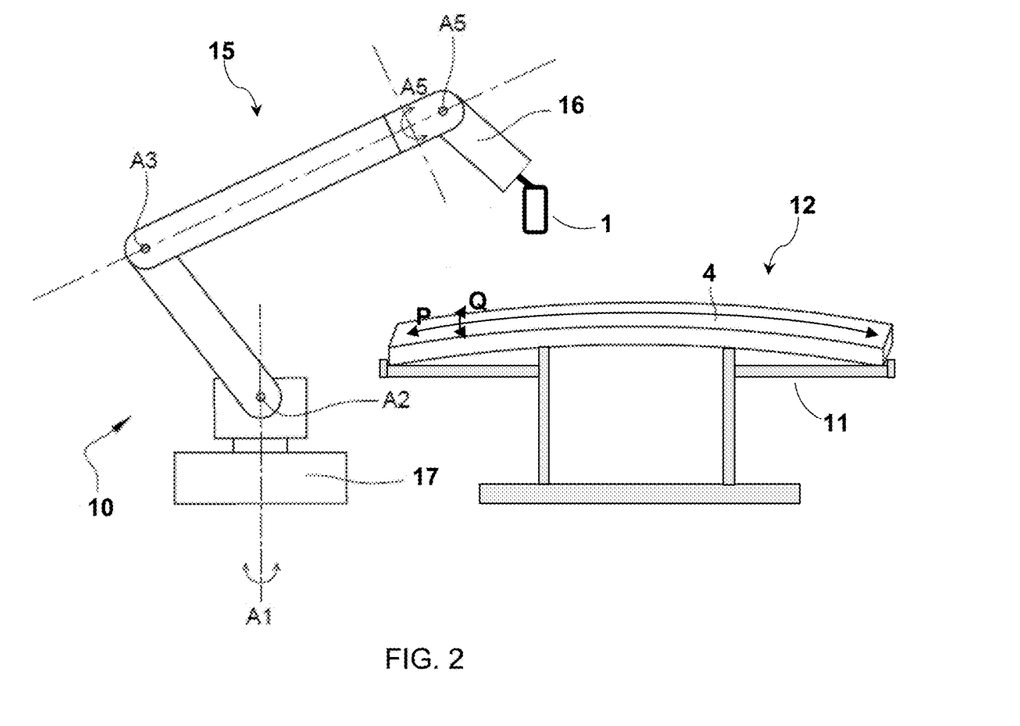
FIG. 2 schematically shows the surface treatment device according to the invention, that makes it possible to implement the process for selectively and locally treating the surface according to the invention.

FIG. 2 schematically shows a device 10 according to the invention that makes it possible to execute the process according to the invention. This device comprises a robot mounted on a body 17; in this example this is a robot with five axes, the axes being marked by the letters A1 to A5. The articulated arm 15 of the robot comprises at its end a gripping arm 16 on which said measuring head 1 can be mounted as well as the surface treatment tool. The part 12 to be treated rests on a support 11 that allows for a reproducible and identical positioning of parts that are supposedly identical of the same series. The surface 4 to be treated of the part 12 is directed upwards. Here, this is a curved part; the directions P and Q indicated in this figure are explained hereinbelow in relation with FIG. 3. The device 10 is controlled by a programmable computer (not shown in the figure).

The term "computer" such as used here includes especially computers and programmable (logic) controllers. Said computer is intended and able to control the activity of a device 10 according to the invention, and for this purpose it especially comprises a computer program comprising program code instructions for the execution of the steps of a process according to the invention, when said program operates on said computer.

Said surface treatment tool can be integrated into said measuring head, or can be contained in a box separate from the one of said measuring head, which can then be engaged with said measuring head. In another embodiment, not shown in the figures, the gripping arm 16 alternatively grasps the measuring head and the surface treatment tool, knowing that the measuring head and the surface treatment tool are deposited on a receiving station when they are not used.

Figure 3:
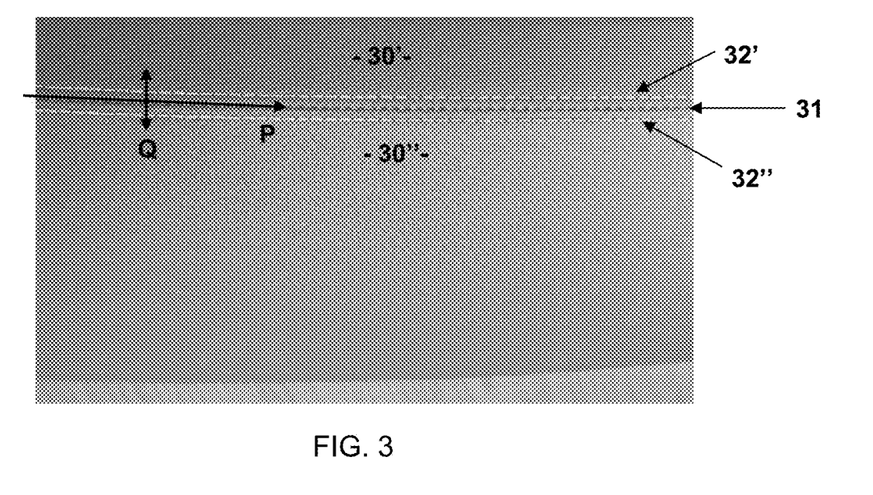
FIG. 3 is the photograph of a cover part of a dashboard of a motor vehicle that has three parallel lines of false seams, the two peripheral lines of which were treated by printing with the process according to the invention. The length of each false seam line is here about 4 to 6 mm, and the width thereof is about 1 mm.
Figure 4A:
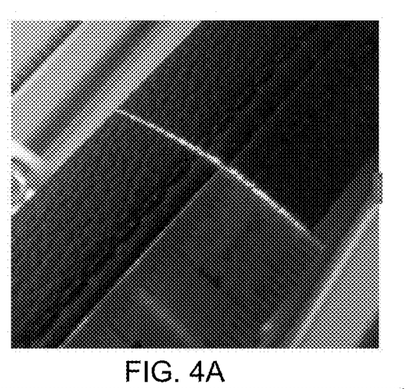
FIGS. 4A to 4C show four steps of the process according to the invention (applied to a dashboard cover part similar to that shown in FIG. 3), namely the acquisition of the surface relief by a laser beam scanning in the direction orthogonal (direction Q) to the line of false seams and being displaced in the direction parallel (direction P) to said line (FIG. 4A); a surface relief in the direction orthogonal (direction Q) to the seam line, raw (curve (1)) and retreated via subtraction of the curve (FIG. 4B); the reconstruction of a three-dimensional image of the analyzed surface (FIG. 4C) by a succession of acquisitions (the height in the direction orthogonal to the plane Q-P being expressed as gray levels); a binary image (black and white) of the critical surface aspects, identified with black ink for the purpose of the selective decoration thereof (FIG. 4D).

FIG. 3 shows the photograph of a part treated by the process according to the invention, here a cover part of a dashboard of a motor vehicle. This part comprises a zone of false seams, that extends parallel to the lengthwise direction of the part. More precisely, the artificial seam of the part comprises two relief aspects: a central seam 31, that simulates the connection between two portions 30', 30" of the part that has parallel edges, and two peripheral seams 32', 32" parallel to said central seam 31. In the peripheral seams the stitches appear as higher height with respect to the plane of the part than the central seam. The segment Q represents the scanning of the laser beam of the profilometer 1 on each point selected on a line P that corresponds to the said central seam 31. This laser beam is shown in FIG. 4A which is a photograph of a part similar to the one of FIG. 4 (but of a darker color); on the lower portion of the image a ruler calibrated in centimeters is noted that was placed on a portion of the surface of the part.

In the second step of the process according to the invention a three-dimensional data file F1 is thus acquired making it possible to locate the relief in the plane of the surface to be treated, and to quantify for each point in this plane the height or depth with respect to said plane.

Figure 4B:
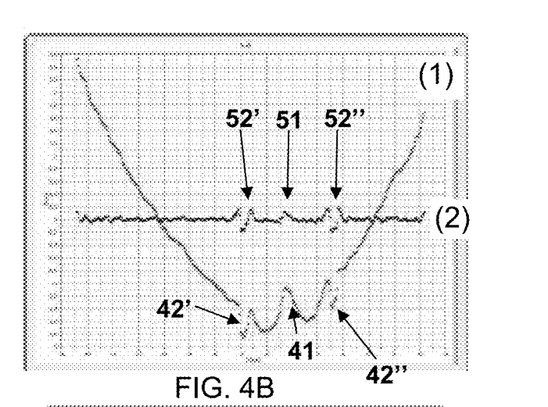

FIG. 4B shows the raw profilometric curve corresponding to the line Q (curve (1)) obtained at a point on the line P, and the same profilometric curve after digital rectification (curve (2)). This curve (2) represents the variation in the height of the surface with respect to a base level that corresponds to the curved surface of the part. The two peripheral seams 42', 42" and the central seam 41 are identified on the raw curve (1). After digital rectification (curve (2)) the two peripheral seams 52', 52" and the central seam 51 appear on a straight plane.

Figure 4C:
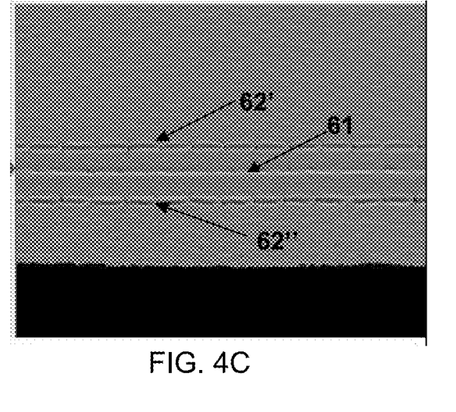

FIG. 4C shows a reconstructed image according to profilometric measurements taken successively on several parallel segments Q located on a certain length of the line P. This image is obtained after rectification of the profilometric lines, i.e., from profilometric lines such as shown in FIG. 4B, curve (2). The data were also filtered. Thus, FIG. 4C shows the data of the file F2 at the end of the third step of the process according to the invention; the gray level represents the height with respect to said base level. It shows the artificial seams in a three-dimensional coding.

If it is sought to subject only the peripheral stitches of the surface to be treated to the treatment, especially via deposition of material, for example with inkjet printing, the three-dimensional data of the file F2 can be subjected to a digital processing that eliminates the central seam. This digital processing can involve digital filters taking account of the height with respect to the plane of the surface, and/or taking account of the surface morphology. At the end of the fourth step of the process according to the invention a file F3 of reprocessed three-dimensional data is thus obtained that represents a binary image of the surface to be treated.

Figure 4D:
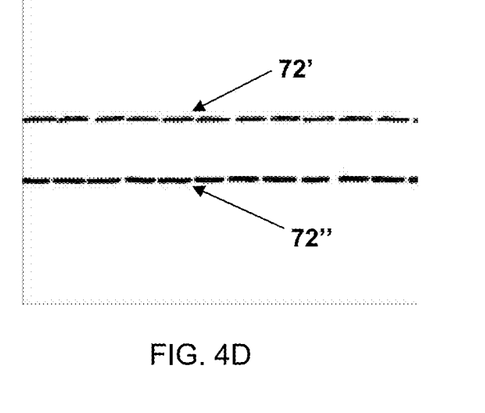

FIG. 4D shows such a binary image (i.e., in black and white) obtained from three-dimensional data of the file F2 by a suitable filtering. Here, this filtering was designed to remove the central seam 31 that was not to be treated by the surface treatment. The lines 72', 72" correspond to the seams 32', 32". This binary image corresponds to a file F3 of binary data, that indicates for each elementary point whether a surface treatment has to be performed (typically by projection of a drop of ink or varnish) or not. The points that constitute this file F3 are preferably defined on a two-dimensional space.

As an intermediate conclusion, as indicated hereinabove, the curve of the heights obtained on a profilometric line (curve (1) of FIG. 4B) enters into the construction of the file F1. This file comprises for each point in the plane QP a height orthogonal to this plane. After rectification and various digital filtering operations of the data the file F2 is obtained: the surface can thus be represented by a reconstructed image wherein the height is represented as a gray level, as in FIG. 4C.

The process according to the invention does not directly use this file F2 to carry out the surface treatment via deposition of material, this deposition being carried out via projection of drops of ink or varnish. It is therefore necessary to transform the file F2, that comprises three-dimensional data, with a height value for each point in the plane QP, into a file F3, wherein each point in the plane QP is associated no longer with a height but with a binary value, that indicates the presence or the absence of the surface treatment at this point.

This filtering process that leads to the file F3 of binary data, and which represents the fourth step of the process according to the invention, shall now be explained in greater detail.

Figure 5A:
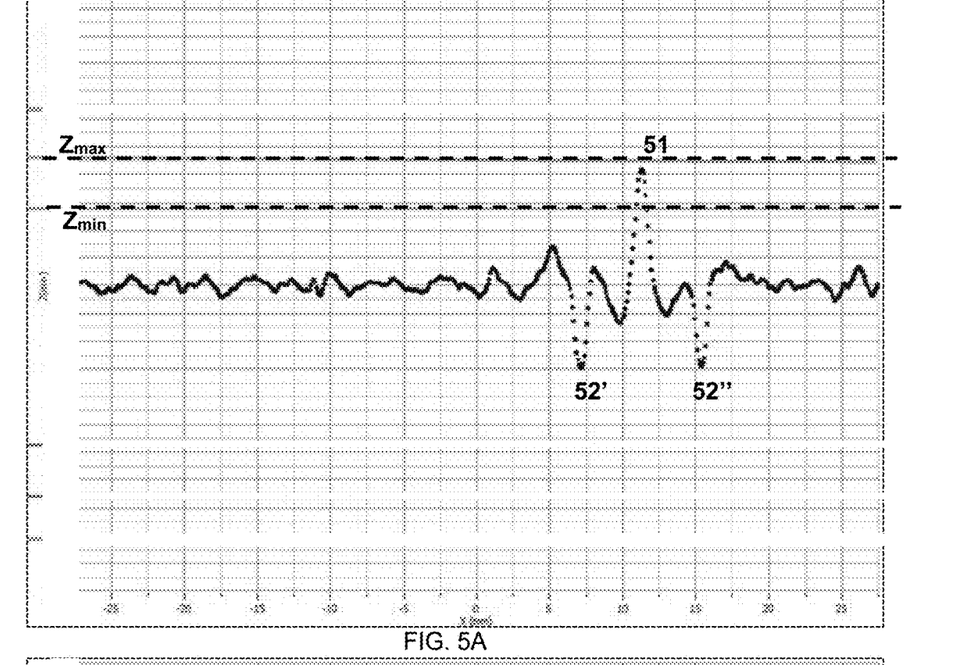
FIGS. 5A to 5C show a curve similar to the curve (2) of FIG. 4B, which also shows three false seam lines of a dashboard.
Figure 5B:
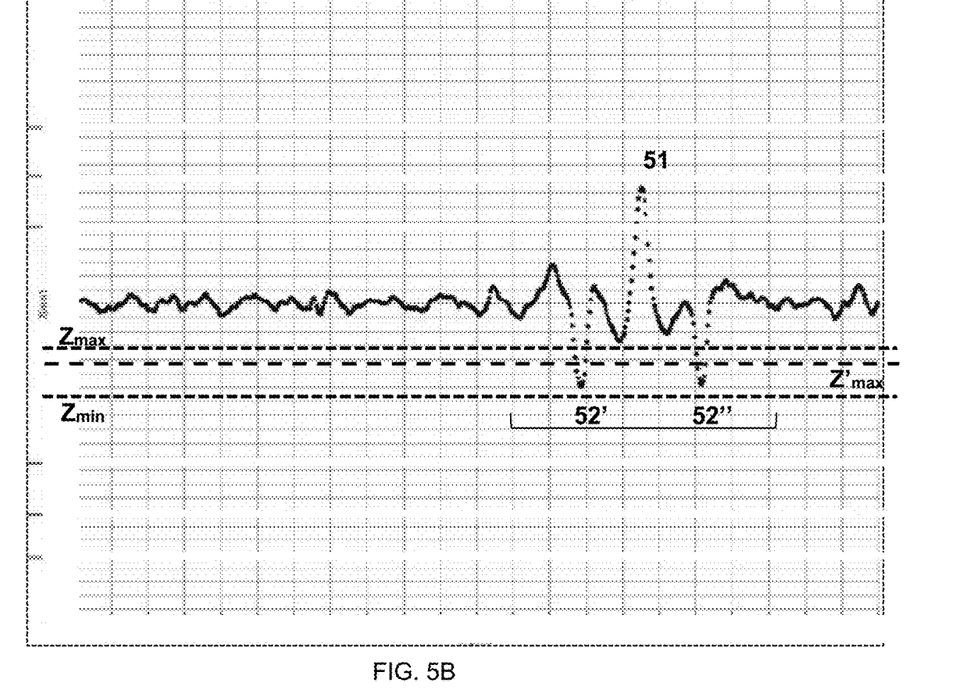
Figure 5C:
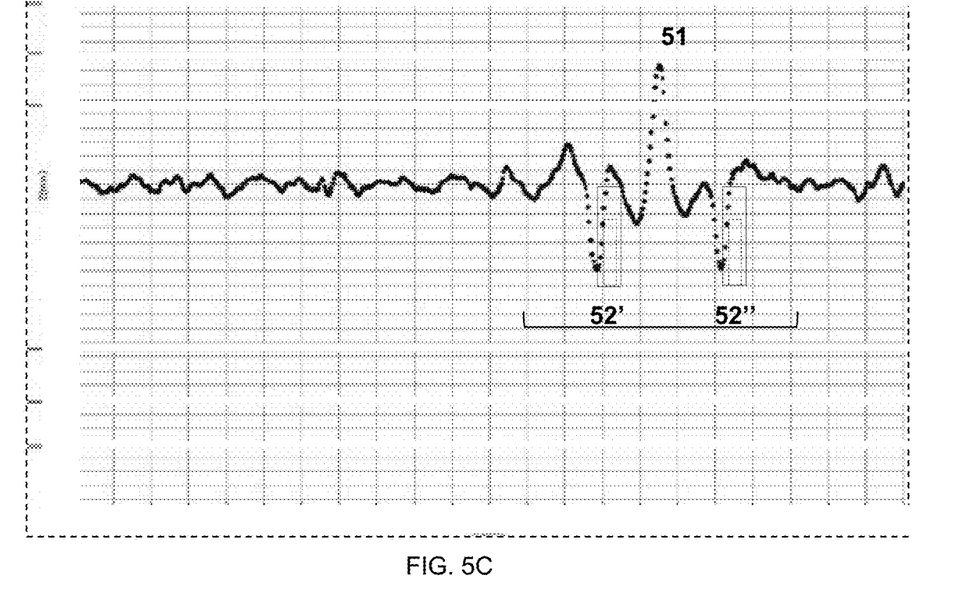
Figure 6A:
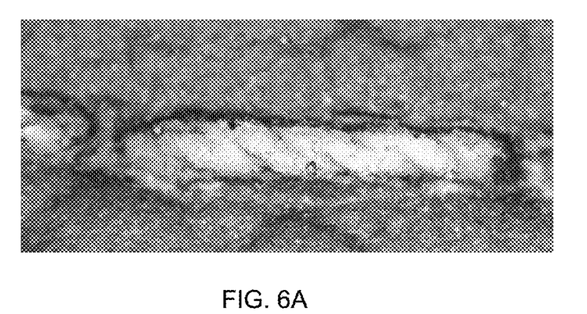
FIG. 6 shows the optical micrograph of the four false seam lines (these lines being similar to those that form the two peripheral lines of lines in FIGS. 3 and 4C after decoration with gray ink using the process according to the invention. The length of each false seam line is about 4 mm. In this example, the ink is deposited on high zones of the relief.
Figure 6B:
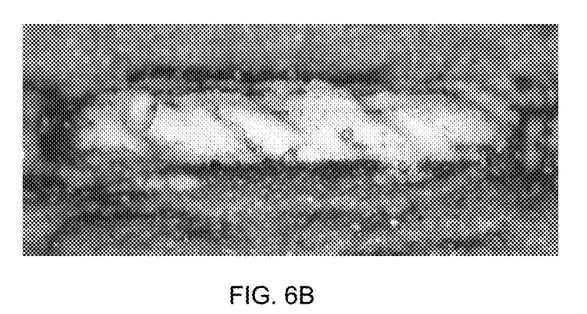
Figure 6C:
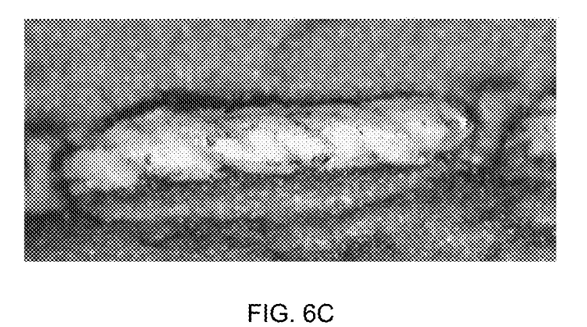
Figure 6D:
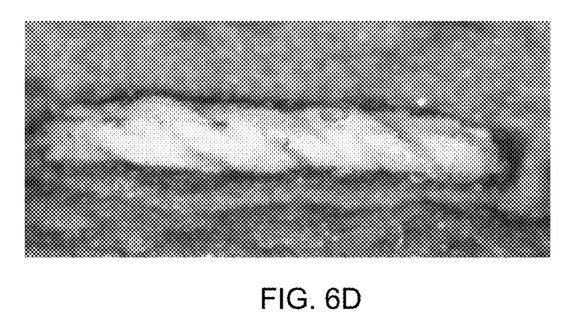

FIGS. 5A to 5C show a profilometric line after digital rectification, similar to the curve (2) of FIG. 4B. The horizontal axis represents a position on the segment Q (FIG. 3), the vertical axis a height with respect to the plane QP. Two peripheral seams 52', 52" and the central seam 51 are distinguished.

FIGS. 5A to 5C (showing three alternatives) will be used here to explain the use of thresholds Zmax, Zmin to define the zones on which the surface treatment will be applied.

This thresholding is explained here for a single profilometric line; it is thus possible to proceed line by line, but in practice it is more advantageous to perform this operation using all the three-dimensional data of the file F2.

This transformation can be done by a suitable filtering. It has to be adapted to each type of surface topography.

By way of example, the principle of such a filtering is illustrated in FIGS. to 5C for the case of false seams. It comprises a step wherein the aspect of the surface to be treated is identified. This can be done via a clipping, which can be symmetric or non-symmetric (or even unilateral). FIGS. 5A and 5B show two different symmetrical clippings, which do not have the same purpose: the clipping of FIG. 5A aims to identify the central seam 51, for the purpose of the selective surface treatment thereof, while the clipping of FIG. 5B aims to identify the two peripheral seams 52', 52", for the purpose of the selective treatment thereof. In the example of FIG. 5A a threshold Zmax and a threshold Zmin are fixed in such a way as to select the zone of the central seam 51, and the height values (vertical axis) are transformed into binary values: "black" for any point on the horizontal axis of which the height value is between Zmin and Zmax, and "white" for any point on the horizontal axis of which the height value is above Zmax or below Zmin. Thus a binary data file is constructed, called file F3 here. In the fifth step of the process according to the invention, a point on the profilometric line to which the value "black" was attributed (its name is of no importance) will then be subjected to the selective surface treatment, while a "white" point will not be subjected to said selective surface treatment.

The values of the thresholds Zmin and Zmax can be determined automatically, or manually. It is performed especially for the first part of a series of parts that are supposedly identical (typically: manufactured in the same mold); indeed, in many cases this determination of the thresholds on a rectified profile makes it possible to treat a series of parts that are supposedly identical in a stable and reproducible manner. It should be noted that in practice the surface of the parts, even coming from the same mold, is not entirely reproducible, and that these deviations do not make it possible to obtain a satisfactory result by printing an image on the surface according to the processes of the prior art.

As is shown in FIG. 5B, a threshold Z'max less than the threshold Zmax can for example be chosen. A narrower surface treatment zone on the horizontal axis is thus obtained; this is shown in FIG. 5C where the box in dotted lines represents the width of the zone obtained with a threshold Zmax lower than the box in solid lines.

It can also be chosen to locate the zones of interest 52', 52" with a lower width in the example of FIGS. 5B and 5C: with a threshold and Zmax that is lower, and then to artificially widen (dilate) the zone to be treated thus defined, for example by a constant width. As mentioned hereinabove, this clipping and this selection of the zone of interest can be done manually, for a given type of part. This step can require the generation, temporarily, of a file F3 to view the binary image thus obtained; the threshold Zmax and/or Zmin can then be modified to obtain a satisfactory result. As indicated hereinabove, typically, this configuration is performed for a test part in a series of parts that have the same type of surface topography (for example, dashboard parts coming from the same mold).

According to a particular advantageous embodiment of the invention additional treatments are carried out on the binary file to improve the quality of the surface treatment, and especially the quality of the positioning thereof. By way of example, it is possible to dilate (enlarge) the zones in black, or on the contrary erode the zones in black. It is possible to remove the isolated black points (considered as noise) or the contiguous zones of black points that do not exceed a certain surface area (expressed as a number of pixels). It is also possible to round the angles of the black zones. It is also possible to remove the holes inside black zones. These additional treatments performed on the binary file are very advantageous for obtaining a surface treatment of high quality, such as is required by the automobile industry, the leatherwork industry and other industries of products that have high requirements in surface quality.

FIGS. 6A to 6D show four enlarged photos of stitches colored by the process according to the invention, using a gray ink. The part is the same as the one of FIGS. 3 and 4A to 4D. Note the extraordinary precision of this surface treatment of a selective and localized surface.

Figure 7A:
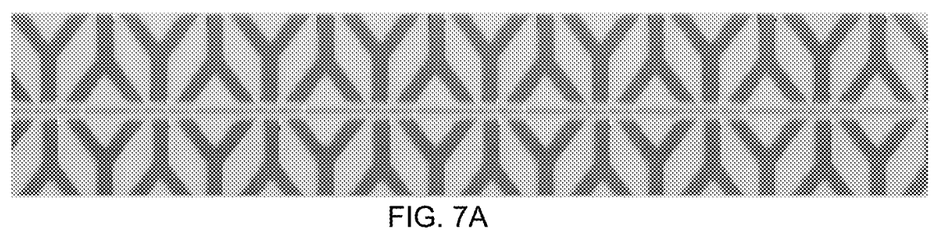
FIGS. 7A and 8A show the reconstruction of a three-dimensional image of the surface analyzed by a succession of acquisitions (the height in the direction orthogonal to the plane Q-P being expressed by gray levels)
Figure 7B:
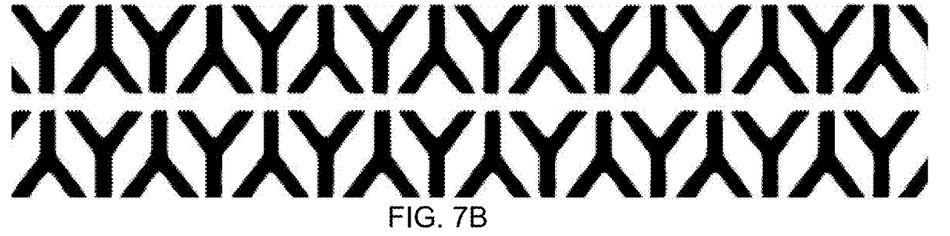
FIGS. 7B and 8B show a binary image of the critical surface aspects, identified for the purpose of the selective decoration thereof. In both cases, the ink is deposited on zones in a depression (hollow of the relief).

FIGS. 7A and 7B show another surface that can be treated by the process according to the invention. Here, this is a PVC surface on which was created by embossing a regular relief with "Y"s in depression. FIG. 7A shows the relief represented as gray levels (which is a representation of the file F2), FIG. 7B shows the binary image (bitmap) that corresponds to the file F3, coming from the file F2.

Figure 8A:
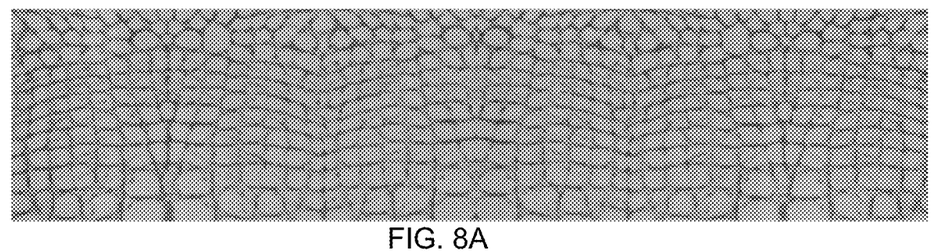
Figure 8B:
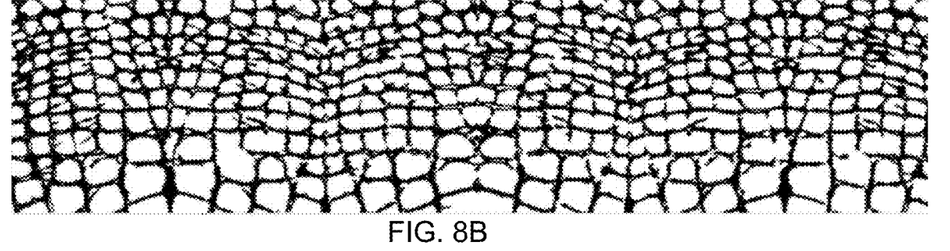

FIGS. 8A and 8B shows another surface that can be treated by the process according to the invention. Here, this is a surface of the "crocodile skin" type, natural or artificial (carried out for example by embossing on a PVC surface). FIG. 8A shows the relief shown in gray levels (file F2), FIG. 8B shows the binary image (bitmap) coming from the file F2.

In the examples of FIGS. 7A, 7B, 8A, and 8B, the surface treatment (here the deposition of ink) was performed in zones in depression with respect to their environment, but the process can be applied in the same way to treat zones that are located in height with respect to their environment, as the seams of the part shown in FIG. 3.

In the example of the part shown in FIG. 3, note that the line of the parallel seams 31, 32', 32" is not a straight line. For the scanning by the measuring head 1, a straight line P can be followed, if the scanning width Q is sufficiently greater than the width required to cover the seams and their environment on either side of the peripheral seams 32', 32". In case of need it is possible to subdivide the width of the part in its lengthwise direction into several segments; the measuring head 1 will follow a straight line P on each one of the segments, with a translation in the orthogonal direction between two neighboring segments. Alternatively, a continuous adaptation of the position of the measuring head 1 during the scanning thereof can be provided; however, this substantially increases the quantity of digital data to be processed.

In a series-type production involving the treatment of identical parts, it is advantageous, in order to obtain optimum resolution and precision, to proceed for each individual part with the profilometric scanning of the surface, because even within a series of parts that are supposedly identical the deviations between two parts are large enough to generate visible deviations after decoration. On the other hand, the digital filtering to transform the file F1 into file F2 can be defined for a series of parts that are supposedly identical, because the local variation between two parts must normally be less than the difference between the reliefs of the central seam and of the peripheral seams; this supposes in practice that each part can be positioned under the head in a reproducible manner. It is therefore necessary to have a support adapted to each type of part.

The process according to the invention can be applied in many sectors of the industry. It can be used to decorate cover parts for a passenger compartment of a land, sea or air vehicle. By way of example, it can be used to decorate the surface of automobile dashboards, and to decorate other visible parts used for covering in an automobile passenger compartment. It can be used in the leather, leatherwork and furnishings industry, to decorate natural or artificial leather surfaces, intended for the most diverse uses. This decoration can especially relate to the visible seams of decorative parts, which can be artificial (in the case of parts made of plastic material, for example made of PVC) or functional (in the case of parts made from natural leather). It can also relate to the graining of grained surfaces, such as the graining of leather or of surfaces of the "crocodile skin" type, or any type of surface relief obtained by technical processes. It can more generally relate to all surface aspects that represent the bottom of a low relief or the top of a relief.

The process according to the invention can be carried out with many alternatives.

By way of example, the zone to be treated can be pre-treated before the deposition of material. This pre-treatment can be for example a corona treatment or a treatment via plasma at atmospheric pressure. It can come from a specific treatment tool, which will then be a pre-treatment tool, carried by the arm of the robot, said tool being displaced on the zone to be pre-treated.

A first layer of material that can be deposited on a zone that is wider than the printing zone calculated by the software can also be deposited. This material can be a bond layer, or a protective layer. It can for example be transparent, or translucent, and possibly colored, or it can be opaque.

The surface treatment can relate to decoration and/or protection. A first decoration surface treatment can for example be performed, in one or more passes, and a second protective surface treatment, in one or more passes. Said first and second surface treatment can be based on the same file F3 or on different files F3; the second file F3 able to be obtained for example digital dilatation of the "black" points of the first file F3. The same remark applies to the different passes of a decorative and/or protective treatment, that can be strictly superimposed, or the second pass can use dilated points, or narrowed points, or a file F3 obtained with a different thresholding Zmax–Zmin; each one of these alternatives can lead to particular decorative effects, especially if different inks are used. For this purpose more generally any other digital transformation of the file F3 is possible.

Also, after one or more passes of surface treatment via deposition of material, a new acquisition of profilometric data can be performed to resume the process according to the invention at its second step. This will be useful especially when a substantial thickness of material is deposited during the decoration of the surface.

In an alternative of the process according to the invention, in the fourth step a file representing a binary image of the surface is not created, but a ternary image or even more complex. By way of example, it is possible to perform on the same file 2 the treatment via the thresholds Zmin and Zmax aiming to select the central seam 51, as in FIG. 5A, and the treatment via the thresholds Zmin and Zmax aiming to select the peripheral seams 52', 52", as in FIG. 5B of data; a first fixed value is therefore allocated to the points of the surface treatment of the central seam, and a second fixed value to the points of the surface treatment of the peripheral seams, and a third fixed value to points without surface treatment. During the fifth step of the process, the two different surface treatments can then be performed successively with two separate treatment tools, or with a single treatment tool capable of selectively performing two different treatments; such a tool can be an inkjet printhead capable of projecting ink of two different colors.

In another alternative of the process according to the invention, the profilometric data are calculated from images recorded by an optical camera that replaces, the measuring head 1 and of which the images are analyzed in order to obtain a binary image of the surface. The surface treatment can also comprise at least one step of transforming the surface by means that do not involve the deposition of material, or it can consist entirely of steps that do not involve the deposition of material. By way of example, said step of transforming the surface by means that do not involve the deposition of material can be: bombarding the surface with particles, irradiation of the surface by a beam of light, local adding of heat, drilling of holes via laser beam. These steps of transforming can have for purpose especially the chemical transformation of a surface layer of the material (for example a crosslinking or a photochemical or thermal hardening), or the physical transformation thereof (for example via local fusion).

What is claimed is:

1. A process for selectively and locally treating the surface of a part, the process comprising:
    providing a part having a surface to be treated, said surface being defined by a direction P and a direction Q, said surface forming one or more curves;
    acquiring a three-dimensional profilometric data from the surface to be treated, in order to obtain a set F1 of three-dimensional data on the surface to be treated, said set F1 associating a height with each point in the plane PQ;
    digitally processing the set F1 of data with a view to subtracting said curves, to obtain a set F2 of reprocessed three-dimensional data on the surface to be treated;
    digitally processing the set F2 of data, to obtain a set F3 of binary data on the surface to be treated, said digital processing attributing, to each point on the surface, a first binary value or a second binary value, depending on at least one criterion related to the height of the point on the surface; and
    selectively and locally treating the surface using said set F3 of binary data only at points on the surface the binary datum of which has said first binary value or said second binary value.

2. The process of claim 1, wherein in digitally processing the set F1 of data, at least one data filtering operation is performed.

3. The process of claim 1, further comprising remove aberrant points by performing at least one data filtering operation.

4. The process of claim 1, further comprising removing isolated points from the surface treatment by reprocessing the set of data F3.

5. The process of claim 1, further comprising removing contiguous zones from the surface treatment that do not reach a certain surface area by reprocessing the set of data F3.

6. The process of claim 1, further comprising widening the contiguous zones of the surface treatment by reprocessing the set of data F3.

7. The process of claim 1, further comprising rounding the angles of the zone of the surface treatment by reprocessing the set of data F3.

8. The process of claim 1, further comprising removing holes of a size less than a certain number of points inside a zone of the surface treatment by reprocessing the set of data F3.

9. The process of claim 1, wherein said surface to be treated has surface elements in relief.

10. The process of claim 1, wherein:
said three-dimensional profilometric data are obtained from a succession of linear scans according to scan lines parallel to said direction P, with a constant spacing between two neighboring scan lines, and
said constant spacing is less than 90 µm.

11. The process of claim 1, wherein said surface treatment is identical for all points the binary value of which takes said first value or said second value.

12. The process of claim 1, wherein a first surface treatment is performed for the points the binary datum of which takes said first binary value, and then a second surface treatment for the points the binary value of which takes said second binary value.

13. The process of claim 1, further comprising:
repeating digitally processing the set F2 of data to obtain a set of data F3' with a criterion related to the height of the point of the surface different from the one that was used to generate said set of data F3, and
performing a treatment to selectively and locally treat the surface using said set F3 and performing a treatment to selectively and locally treat the surface using said set F3', said treatments being identical or different.

14. The process of claim 1, wherein said treatment of the surface comprises:
performing material deposition of ink, or
removing material by drilling a hole, or
performing chemical modification of the surface by supplying energy to crosslink the surface.

15. The process of claim 1, wherein said part is selected from the group consisting of:
cover parts of a vehicle passenger compartment,
parts made from natural leather or artificial leather,
parts having a fabric surface,
metal parts manufactured in contact with a surface of a mold, and
plastic parts manufactured in contact with a surface of a mold.

16. Use of the process of claim 1, for decoration of parts having a regular surface relief or an irregular surface relief, said regular surface relief or said irregular surface relief to represent a graining, a seam, a seal, an edge, and a stamping.

17. A device comprising:
a robot comprising at least one surface treatment tool and at least one gripping arm configured to carry a laser profilometer and acquire three-dimensional profilometric data; and
a computing device communicating with said robot, said laser profilometer, and said at least one surface treatment tool, said computing device being configured to control said robot, said laser profilometer, and said at least one surface treatment tool,
wherein said device is configured to implement a process for selectively and locally treating the surface of a part by:
providing a part having a surface to be treated, said surface being defined by a direction P and a direction Q, said surface forming one or more curves;
acquiring a three-dimensional profilometric data from the surface to be treated, in order to obtain a set F1 of three-dimensional data on the surface to be treated, said set F1 associating a height with each point in the plane PQ;
digitally processing the set F1 of data with a view to subtracting said curves, to obtain a set F2 of reprocessed three-dimensional data on the surface to be treated;
digitally processing the set F2 of data, to obtain a set F3 of binary data on the surface to be treated, said digital processing attributing, to each point on the surface, a first binary value or a second binary value, depending on at least one criterion related to the height of the point on the surface; and
selectively and locally treating the surface using said set F3 of binary data only at points on the surface the binary datum of which has said first binary value or said second binary value.

18. The device of claim 17, wherein said computer is configured to perform said digital data processing.

19. The device of claim 17, wherein said surface treatment tool comprises an inkjet printhead.

20. The device of claim 17, wherein said surface treatment tool comprises a laser light emitter.

* * * * *